J. L. BARDEN & S. CRUDDEN.
Rotary Churn.

No. 166,181. Patented Aug. 3, 1875.

UNITED STATES PATENT OFFICE.

JAMES L. BARDEN AND SAMUEL CRUDDEN, OF HAMILTON, OHIO.

IMPROVEMENT IN ROTARY CHURNS.

Specification forming part of Letters Patent No. 166,181, dated August 3, 1875; application filed May 17, 1875.

*To all whom it may concern:*

Be it known that we, JAMES L. BARDEN and SAMUEL CRUDDEN, of Hamilton, in the county of Butler and State of Ohio, have invented a new and useful Improvement in Churns; and we do hereby declare that the following is a full and exact description thereof, reference being had to the accompanying drawings and to the letters of reference marked thereon.

Figure 1:
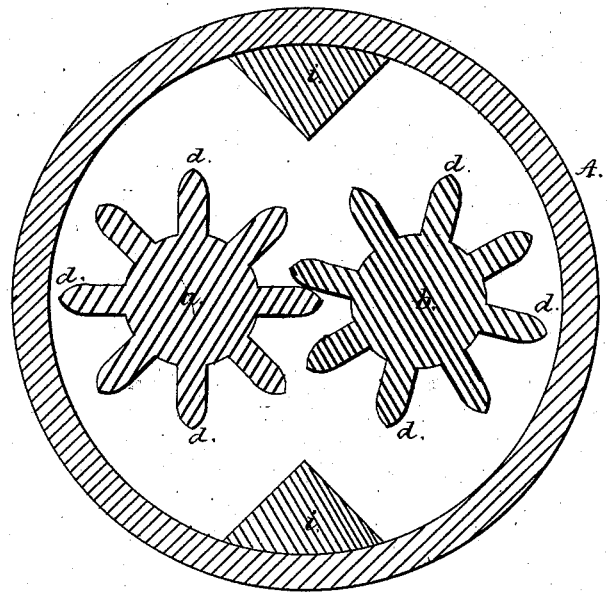
Figure 2:
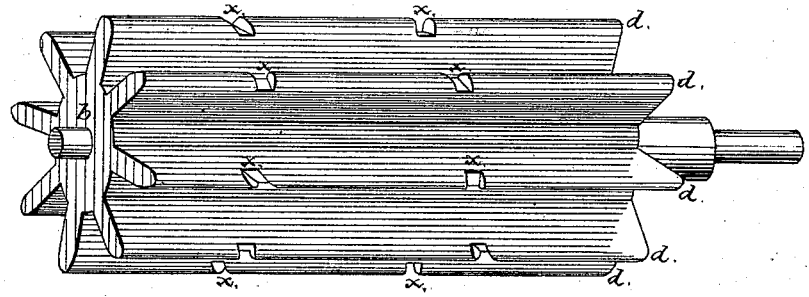

Figure 1 represents a transverse or horizontal section of our improved churn, and Fig. 2 represents one of the cogged agitators detached.

Our improvement in churns consists in the use of a cylindrical vessel with two cogged agitators in combination with two deflectors, arranged and used as hereinafter described.

The vessel A may be made like a common wooden bucket or churn, and provided with suitable steps in its bottom for the lower gudgeons of the two vertical agitators, $b$ $c$, and the journals at the upper ends of the agitators will have their bearings in the cover of the churn. One of the journals is to pass up through the churn-cover, so that suitable gearing may be attached to it. The broad longitudinal cogs or flanges $d$ have notches $x$ formed at different angles across their edges for the purpose of causing counter currents when in use. The vertical cogged agitators are placed in close connection, so as to cause their cogs to overlap and mesh closely, as represented in Fig. 1. The V-shaped vertical deflectors $i$ are secured to the sides of the vessel A, and serve to divide and direct the contents of the churn as they pass between the agitators $b$ $c$.

Our churn is particularly designed to make butter from new milk; and the process observed in using it consists in placing an equal weight of butter and of new milk in the churn, and agitating them by the revolution of the cogged agitators $b$ $c$, causing them to commingle. A largely-increased percentage of butter obtained from the milk results from the use of our improvement in this manner. The action of the meshing cogs and the deflectors upon the butter and milk is such as to cause the former to gather to itself all the oleaginous particles contained in the milk; also the caseine is incorporated with the butter, leaving only the serum or watery part of the milk in the churn at the end of the operation when the butter is removed.

Having described our invention, we claim and desire to secure by Letters Patent—

The combination and arrangement of the agitators $b$ $c$ and deflectors $i$, when the former are provided with the notches $x$, substantially as described, for the purpose specified.

Witness our hands this 3d day of May, 1875.

JAS. L. BARDEN.
      SAMUEL CRUDDEN.

Witnesses:
 H. P. K. PECK,
 JAS. B. BARDEN.